United States Patent [19]

Rosier et al.

[11] Patent Number: 4,638,370
[45] Date of Patent: Jan. 20, 1987

[54] APPARATUS FOR DIGITALIZING AN IMAGE BY ANALYSIS BY MEANS OF A LIGHT BEAM

[75] Inventors: Jean-Claude Rosier; Claûde Fouche, both of Gasny; Gabriel Maincent, Tourny, all of France

[73] Assignee: Societe Europeenne de Propulsion, France

[21] Appl. No.: 725,743
[22] PCT Filed: Aug. 23, 1984
[86] PCT No.: PCT/FR84/00191
§ 371 Date: Apr. 22, 1985
§ 102(e) Date: Apr. 22, 1985
[87] PCT Pub. No.: WO85/01170
PCT Pub. Date: Mar. 14, 1985

[30] Foreign Application Priority Data

Aug. 24, 1983 [FR] France .................. 83 13663

[51] Int. Cl.[4] .................................... H04N 1/06
[52] U.S. Cl. ................................ 358/293; 358/285
[58] Field of Search ............ 358/285, 290, 292, 293, 358/294

[56] References Cited

U.S. PATENT DOCUMENTS

| 2,044,831 | 6/1936 | Chereau et al. | 358/290 |
|---|---|---|---|
| 2,298,911 | 10/1942 | Young | 358/290 |
| 2,422,778 | 6/1947 | Finch . | |
| 3,816,659 | 6/1974 | Landsman | 358/290 |
| 3,860,747 | 1/1975 | Orii et al. | 358/292 X |
| 4,131,916 | 12/1978 | Landsman . | |
| 4,422,100 | 12/1983 | Du Vall et al. | 358/293 |

FOREIGN PATENT DOCUMENTS

| 482842 | 9/1929 | Fed. Rep. of Germany . | |
|---|---|---|---|
| 1948854 | 11/1970 | Fed. Rep. of Germany . | |
| 2391612 | 12/1978 | France . | |
| 11446 | of 1908 | United Kingdom | 358/290 |
| 1099040 | 1/1968 | United Kingdom . | |

OTHER PUBLICATIONS

Telecommunications and Radio Engineering, vol. 25, 26, pp. 21–27, Oganov et al., 3/1971.

Primary Examiner—Michael A. Masinick
Assistant Examiner—John C. Fox
Attorney, Agent, or Firm—Ostrolenk, Faber, Gerb & Soffen

[57] ABSTRACT

The carrier of the image to be analyzed is fixed on a transparent cradle shaped as a portion of cylinder; a light beam is sent back perpendicularly to the cradle by a mirror pivoting about an axis which blends with the axis of the cradle and which is moved with respect to said cradle in order to light up, successively, and line by line, the image elements of the image to be analyzed; the light beam after traversing the image carrier is sent back on to an optico-electrical device by means of an elliptical mirror, so as to return, without introducing any aberrations, the light issued from the different image elements of one line.

4 Claims, 2 Drawing Figures

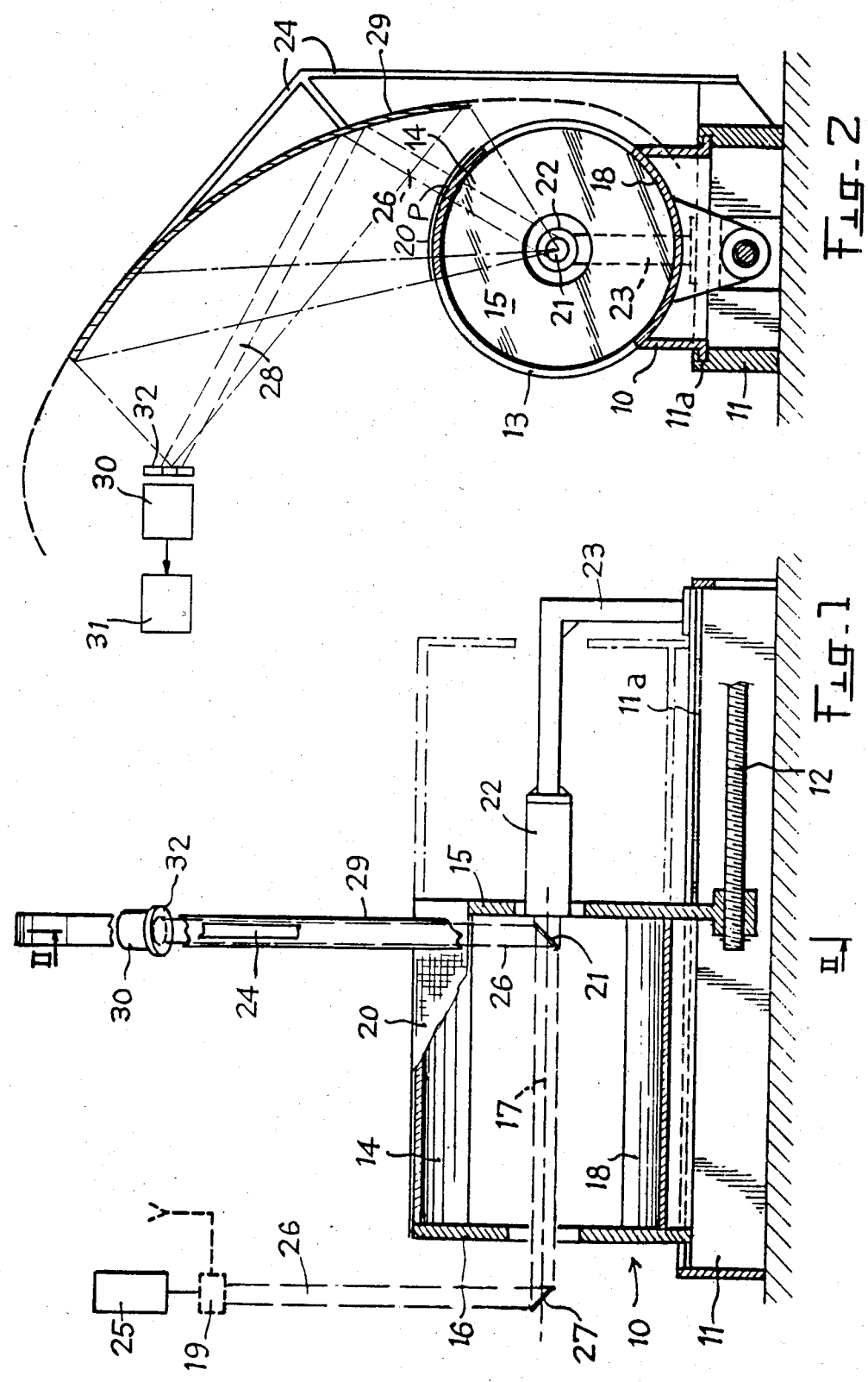

APPARATUS FOR DIGITALIZING AN IMAGE BY ANALYSIS BY MEANS OF A LIGHT BEAM

The present invention relates to an apparatus for digitalizing an image by analysis by means of a light beam, and more particularly to an apparatus of the type comprising means for fixing the carrier of an image to be analyzed, at least one source of light, a first optical device for projecting a light beam issued from said source onto the image to be analyzed, means of relative displacement between the beam and the image carrier for successively lighting, line by line, the elements of image of the image to be analyzed, and a converter comprising an optico-electrical device to convert in digital form the information representing the image elements.

Image digitalizing apparatus as well as apparatus used for restituting digitalized images are employed in particular for transmitting images in connection with systems of teledetection by satellites.

It is a particular object of the invention to provide an apparatus permitting the analysis of images carried by a transparent medium, such as a film.

This object is reached with an apparatus of the aforedescribed type, in which according to the invention:
- the fixing device comprises a transparent analysis cradle shaped as a portion of cylinder and designed to receive the image carrier,
- the first optical device comprises a mirror rotating about an axis which coincides with that of the analysis cradle, said mirror receiving the light beam and reflecting it perpendicularly to the surface of the cradle, and
- a second optical device comprising an elliptic mirror in the focal points of which are placed the pivoting mirror and the optico-electrical device, receives the light which has gone through the analysis cradle and the image carrier, and sends back on a fixed photosensitive zone of said optico-electrical device the light issued from the different image elements of a same line.

Due to the use of an elliptic mirror, no aberration is introduced for all the image elements of every line.

Analysis of successive lines is achieved by means of a stepwise-moving device permitting the displacement of the cradle according to an axial translation, and with respect to the rotating mirror and to the optical devices. The reflecting surface of the elliptic mirror can thus be restricted to a relatively narrow strip of an elliptic surface, the only requirement being that the width of such strip should allow the reflection of the line scanning beam. The construction of an elliptic mirror is therefore relatively simple and rather inexpensive.

According to a special feature of the apparatus according to the invention, said apparatus further comprises a restitution cradle which is separate from the analysis cradle and is designed to receive a carrier of an image to be restituted from information modulating the light beam issued from the light source, both analysis and restituting cradles being situated on the same cylindrical surface and being secured to one another, so that the means used for line scanning and for column scanning the carrier of an image to be restituted are the same as those used for scanning the carrier of an image to be analyzed.

A device for restituting a digitalized image and a device for analyzing an image to be digitalized are thus combined within the same apparatus.

Further features and advantages of the apparatus according to the invention will be more readily apparent on reading the following description made with reference to the accompanying drawings in which:

FIG. 1 is a diagrammatical general view of one embodiment of the apparatus according to the invention, and FIG. 2 is a cross-sectional view along plane II—II of FIG. 1.

The apparatus illustrated in the drawings comprises a carriage 10 which is slidable along a rectilinear slide 11a of a fixed horizontal table 11. The movement of the carriage is controlled by a stepwise motor (not shown) driving in rotation a micrometric screw 12 in engagement with the carriage 10.

The carriage 10 supports a structure 13 of general cylindrical shape whose upper part constitutes a cradle 14 supported by two annular side-plates 15, 16 rising at the longitudinal ends of the carriage 10 perpendicularly to the direction in which said carriage advances. The cradle 14 is designed to receive an image carrier such as a film 20, carrying an image to be analyzed by transmission for subsequent digitalizing. To this effect, the cradle 14 is made of transparent material, such as glass for example. Its shape is that of a portion, situated between two generating lines, of a cylinder of circular cross-section of axis 17 parallel to the direction of movement of the carriage 10. The concave face of the cradle 14 is turned so as to face towards the table 11, and means, such as clamps (not shown) keep the film 20 against the outer convex face of the cradle.

A flat mirror 21 is mounted for rotating about axis 17. The mirror 21 is driven by a motor 22 supported by the fixed table 11 by means of a bent arm 23. A light source 25 generates a light beam 26 which, eventually after reflection onto a fixed plane mirror 27, goes through the central opening of side-plate 16 and is propagated towards the mirror 21, its axis being the axis 17. The reflecting surface of mirror 21 is inclined to form an angle of 45° with axis 17 so that the beam 26 is reflected normally to the cylindrical surface of cradle 14.

FIG. 1 shows the carriage 10 at one end of its run on table 11. The mirror 21 is then located in the vicinity of side-plate 15 in order to be in a position to reflect the beam 26 close to one of the transverse edges of cradle 14. Analysis of the image carried by the film 20 is achieved by moving the carriage 10 stepwise from one end of its run to the other. In a manner known per se, the rotation of mirror 21 and the forward movement of carriage 10 are synchronized so that, for every stable position of the carrier 10 after one step forward, the mirror 21 makes a rotation during which it lights up a complete line of the image to be analyzed, i.e. a narrow transverse strip of the film 20 fixed on the cradle 14. Whilst carriage 10 moves from the position shown in FIG. 1, the motor 22 and, optionally, at least part of the horizontal branch of the arm 23, penetrate through the central opening of side-plate 15.

The light beam 26 obtained after the light has traversed the transparent cradle 14 and the film 20 is reflected by a mirror 29 in the direction of an optico-electrical device 30. Said mirror 29 is an elliptic mirror, namely with a reflecting surface situated on a portion of surface of a straight cylinder having an ellipse as a base, the axis of said cylinder being parallel to the axis 17.

FIG. 2 is a cross-section through a transverse median plane of mirror 29. The cross-section of the mirror is a portion of ellipse E whose focal points are the center of the mirror 21 situated on axis 17 and the center of the photosensitive surface of the optico-electric device 30. FIG. 2 also shows that the mirror 29 has a reflecting surface defined by the dihedron having axis 17 as an edge and containing the longitudinal edges of the cradle 14. Thus, the mirror 29 sends back the beam 28 right along a complete line scanning of film 20. In the longitudinal direction, the mirror 29 has a constant width at least equal to the diameter of beam 28. Thus, it is possible to limit the reflecting surface of the mirror to a relatively narrow strip, therefore rather simple and inexpensive to produce despite its elliptic shape. The mirror 29 is placed above the cradle 14, plumb with the position of the mirror 21 and is supported by means of brackets 24 secured to the table 11.

The apparatus described hereinabove works as follows:

Analysis in black and white is performed with a laser source. The intensity of the laser beam is modulated when traversing the film carrying the image to be analyzed and is converted into an analog electric signal by means of the optico-electrical device 30 which can be a photodiode-type element or a photomultiplier tube. Said signal is sampled and converted to digital form by means of an analog-to-digital converter 31. The sampling rate is determined in connection with the speed of rotation of mirror 21 for the desired number of digitalized image elements (pixels) for every line of the analyzed image. The use of an elliptic mirror 29 prevents the introduction of any aberration during a complete line scanning, the light issued from the different elements of image being sent back to a unique point. The digital information word outputted from the converter represents the grey level of the image elements.

An adjustment of the size of the analyzed element of image is possible by using a diaphragm 32 (FIG. 2) in front of the photosensitive surface of the optico-electrical device 30, the size of said diaphragm defining that of image element P (see FIG. 2). It is possible to provide a plurality of pre-calibrated diaphragms in order to vary the sizes of the image elements in a stepwise way (for example from 10 to 100 microns). Obviously, the diameter of the beam used, at the level of cradle 14, should be at least equal and preferably greater than the size selected for the image element; a wide slightly convergent beam can be used to this effect. The length of the advancing step of the carriage is also adjusted according to the dimension of the image elements. The same highly precise quartz-stabilized oscillator is used for controlling the sampling rate of the converter and the speeds of the motors driving the carriage 10 and the mirror 21.

Color analysis is possible with three laser sources, a red, a green and a blue for example, and whose beams are superposed to simultaneously light the same image element. Separation of the different beams is achieved by placing behind the diaphragm of the optico-electrical device a color separator which uses for example dichroic filters. The separated beams are directed on photo-receiving means (photodiodes or photomultipliers) each affected to a particular color and associated to a particular analog-to-digital converter. Thus are simultaneously obtained the digital information words which represent the analysis of an image element in each basic color.

As a variant, only one photo-receiving member may be used by switching the different sources of light; analysis is then performed by scanning each line three times in succession, i.e. once for every separate color beam.

According to a special feature of the apparatus according to the invention, said apparatus also comprises a restitution cradle designed to receive a carrier for an image to be restituted from digital information. In the illustrated example, the restitution cradle 18 is situated at the lower part of the cylindrical structure 13, cradles 14 and 18 being substantially symmetrical together with respect to axis 17. Accordingly, the shape of cradle 18 is that of a portion taken between two generating lines of the same cylinder of circular cross-section as that according to which is placed cradle 14, the concave face of cradle 18 being turned towards mirror 21. The carrier for the image to be restituted, for example a blank film, is fixed on the concave face of cradle 18 by means such as clamps (not shown). Contrary to the cradle for analysis by transmission, the restitution cradle 18 is produced from an opaque material.

The position of cradle 18 makes it possible to use for the restitution the same line scanning means (pivoting mirror) and column scanning means (stepwise driven carriage) as for the analysis. It is also possible to use the same source of light (black and white) or the same sources of light (color) as for the analysis, except that the intensity of the laser beam issued from the one or more source of light is modulated in relation to the recorded digital information representing the image to be restituted. To this effect, a modulator 19 (shown in broken lines in FIG. 1) is placed at the output of the source and is controlled by video signals worked out from said digital information, the control of the modulator being synchronized with that of the motors driving the mirror 21 and carriage 10. For restituting a color image, the modulated beams issued from the three sources are superposed in order to be applied simultaneously on the same image element.

We claim:

1. An apparatus for digitalizing an image carried by a transparent medium, comprising:
   (a) a transparent analysis cradle shaped as a portion of a cylinder for receiving a transparent medium carrying an image to be digitalized;
   (b) light source means;
   (c) a first optical device for projecting a light beam emitted from the light source means onto an image carried by a medium fixed on the analysis cradle, said first optical device comprising a mirror which is rotatable about an axis aligned with that of the analysis cradle and which is oriented for receiving said light beam and reflecting said light beam perpendicularly to the surface of the analysis cradle;
   (d) means for rotating the mirror about said axis;
   (e) a second optical device comprising optico-electrical means hving a photosensitive surface to convert light received by said photosensitive surface into an electrical signal, and an elliptic mirror with a reflecting surface situated on a portion of a surface of a cylinder having an ellipse as a base and having an axis parallel to the axis of the analysis cradle, the center of the rotatable mirror and the center of the photosensitive surface being respectively substantially located at the focal points of the elliptic mirror, said elliptic mirror receiving the light beams which have gone through the analysis cradle and an image carrying medium fixed thereon as the rotatable mirror is rotated to scan one image line, and said elliptic mirror reflecting the received light beam onto the photosensitive surface so as to convert successive image elements of said image line into respective electrical signals;

(f) means for digitalizing said electrical signals; and (g) means for moving the analysis cradle in translation with respect to the rotatable mirror and second optical device so that an image carrying medium fixed on the analysis cradle is scanned line by line.

2. An apparatus as claimed in claim 1, wherein said analysis cradle is movable stepwise in translation with respect to the rotatable mirror and second optical device.

3. An apparatus as claimed in claim 1, wherein the second optical device further comprises a diaphragm placed in front of the photosensitive surface to determine the size of the analyzed image elements.

4. An apparatus as claimed in claim 1, further comprising a restitution cradle shaped as a portion of a cylinder for receiving a carrying medium for an image to be restituted, and means for modulating the light beam issued from said light source means, said restitution cradle and said analysis cradle having a common axis and being carried by a common support, whereby an image can be restituted by scanning an image carrying means fixed on the restitution cradle with the modulated beam by means of: (i) said rotatable mirror; and (ii) said means for moving the analysis and restitution cradles in translation with respect to the rotatable mirror.

* * * * *